United States Patent [19]  [11] 4,296,009
Kerle et al.  [45] Oct. 20, 1981

[54] WAX-CONTAINING UNSATURATED POLYESTER LAMINATING COMPOSITION WITH AROMATIC TERTIARY AMINE

[75] Inventors: Edward J. Kerle, Granville; Terry R. Beaver, Newark, both of Ohio

[73] Assignee: Owens-Corning Fiberglas Corporation, Toledo, Ohio

[21] Appl. No.: 110,166

[22] Filed: Jan. 7, 1980

[51] Int. Cl.$^3$ .............................................. C08L 91/00
[52] U.S. Cl. ...................... 260/28.5 R; 260/28.5 AV; 156/332; 427/389.8
[58] Field of Search .................. 260/28.5 R, 28.5 AV; 427/389.8

[56] References Cited
U.S. PATENT DOCUMENTS 3,367,994  2/1968  Parker et al. ...................... 260/864

FOREIGN PATENT DOCUMENTS 2705966  2/1977  Fed. Rep. of Germany .

*Primary Examiner*—Melvyn I. Marquls
*Attorney, Agent, or Firm*—Ronald C. Hudgens; Philip R. Cloutier; James B. Wilkens

[57] ABSTRACT

Failure of free radical catalyzed unsaturated polyester laminating compositions containing wax for suppression of styrene evaporation, but not more than about 10 weight percent of non-reinforcing filler, to develop interlaminar adhesion as great as similar compositions without wax can be at least partially overcome by incorporating at least about 0.1 weight percent of a tertiary monoamine having a single aromatic group and two alkyl or hydroxyalkyl groups on the amino nitrogen.

3 Claims, No Drawings

WAX-CONTAINING UNSATURATED POLYESTER LAMINATING COMPOSITION WITH AROMATIC TERTIARY AMINE

TECHNICAL FIELD

This invention relates to the field of laminated resinous articles and to the compositions and methods employed in forming them. More particularly, it relates to improvements in styrene-containing liquid unsaturated polyester resin compositions which also contain wax for suppressing vaporization of styrene during the laminating process, and to methods for using the improved compositions.

BACKGROUND ART

The use of laminating compositions comprising an unsaturated polyester polymer, an ethylenically unsaturated curing agent reactive with the polyester polymer for curing the composition and a catalyst for the cure reaction to form laminated resinous articles is well known. A plurality of thin layers of the liquid composition are successively superimposed over a die or mold, typically with at least partial cure of each layer before superimposition of the next, to build up the laminated article. Usually the article will be reinforced by incorporating a reinforcing filler such as glass fiber, and this may be either applied separately as a mat or fabric of long glass fibers which is impregnated with the liquid composition to form some or all of the layers or it may be predispersed as short strands in the liquid composition. Of the many kinds of articles that can be made in this way, among the most important are boats, automotive body parts, and plumbing fixtures such as tubs and shower enclosures.

The cure of unsaturated polyester laminating compositions is commonly catalyzed by free radial catalysts such as suitable peroxides. The cure can be additionally accelerated, especially at ambient temperature, by the further inclusion of promoters such as cobalt salts and/or tertiary amines. Such catalyst promoters are ordinarily incorporated into the liquid formulation during its compounding well in advance of use and the catalyst subsequently added only immediately prior to use, for once the catalyst is present the compositions will quickly thicken and gel, and ultimately harden, to consistencies unusable for laminating and must therefor be used within a short time.

Where a large proportion, e.g. at least about 25 percent by weight based on the total weight of polyester polymer and curing agent, of non-reinforcing filler is incorporated in the laminating composition, it has been found advantageous to increase the proportion of promoter in order to overcome the cure retarding effect of such heavy filler loadings which is thought to arise from the filler acting as a heat sink to dampen the autocatalytic exothermic temperature rise which normally occurs during the cure reaction. Common non-reinforcing fillers used at high loadings are clays, calcium carbonate, hydrated alumina and the like. When included at about 75 to 100% loadings, the use of about 0.35% N,N-diethylaniline as promoter, all based on the total weight of polyester and curing agent, is typical. High loadings of such non-reinforcing fillers are ordinarily employed in fabricating plumbing fixtures, since they can contribute to meeting requirements for low smoke and flame spread.

When styrene-containing unsaturated polyester laminating compositions are disposed as thin layers during the laminating process, it has been found that objectionable evaporation of styrene therefrom can be reduced if small proportions of wax, such as paraffin wax, are included in and compositions. Only very small amounts of wax are required, from about 0.03 percent up to usually less than one percent by weight, based on the total weight of polyester and curing agent, to reduce the emission of styrene significantly.

However, the incorporation of even such small proportions of wax tends to interfere with the development of interlaminar adhesion in the cured laminated articles formed from these wax-containing compositions. The improved compositions and methods of the present invention provide an advantageous enhancement in the development of interlaminar adhesion while retaining the desiraable suppression of styrene evaporation in wax-containing liquid unsaturated polyester laminating compositions not heavily loaded with non-reinforcing filler.

DISCLOSURE OF INVENTION

One aspect of the present invention is a laminating composition comprising an ethylenically unsaturated polyester polymer, an ethylenically unsaturated curing agent comprising styrene, a free radical catalyst for the cure reaction of the polyester polymer and the curing agent and wax, wherein the improvement comprises the composition further comprising at least about 0.1 percent by weight of a tertiary monoamine having a single aromatic group and two alkyl or hydroxyalkyl groups joined to the amino nitrogen and not more than about 10 percent by weight of non-reinforcing filler, both based on the total weight of the polymer and the curing agent.

In a further aspect, the present invention is a method of forming a laminated resinous article by successively superimposing a plurality of layers of the laminating composition of this invention and curing the superimposed layers.

The polyester polymers which can be used include essentially any general purpose unsaturated polyester resin. Normally and preferably, the acid component of the polyester polymer will be a mixture of about 25 about 75 mole percent of an ethylenically unsaturated diacid, such as maleic or fumaric, and about 75 to about 25 mole percent of an aromatic acid, such as isophthalic or orthophthalic, or a saturated acid. More preferably, the acid component of the polyester polymer will include about 30 to about 50 mole percent ethylenically unsaturated diacid. The hydroxylic component of the polyester polymer can be essentially any glycol or mixture of one or more glycols with high polyols. Typical hydroxylic components of the polyester polymer are simple glycols such as ethylene, propylene, neopentyl, etc. and also more complex materials such as polyether polyols, e.g., polyethylene glycol or polypropylene glycol, and polyester polyols such as terephthalate mixed ester oligomers with ethylene and polyethylene glycols and glycerol.

The ethylemically unsaturated curing agent can include, in addition to styrene, any ethylenically unsaturated material in which the polyester polymer is dispersible to give a fluid mixture and with which it is reactive to effect cure of the laminated articles to be formed, such as α-methyl styrene, vinyl toluene, acrylic and methacrylic esters, etc. Normally and preferably styrene will comprise at least about 50 percent by weight of the curing agent and more preferably at least about 80 percent. When polyester polymers containing a high proportion of reactive unsaturation are employed, it may be desirable to include at least a small proportion of the less active materials such as α-methyl styrene with the more reactive styrene to make up the curing agent.

The free radical catalyst can be any suitable material which will decompose under the desired cure conditions to produce free radicals. Peroxides are normally employed, such as methylethyleketone peroxide, benzoyl peroxide, etc. Also useful are hydroperoxides, such as cumene hydroperoxide, tertiary butyl hydroperoxide, etc. Catalyst promoters such as cobalt and copper compounds can also be included in the laminating composition, especially where cure is to be effected at ambient temperature.

The wax can be any suitable material which will reduce the rate of evaporation of styrene from the laminating composition when it is disposed as a thin layer during the laminating process. Paraffin waxes are particularly effective. About 0.1 to about 0.3 percent by weight, based on polyester plus curing agent, is preferred.

It has been found that the failure of unsaturated polyester laminating compositions containing wax for suppression of styrene vaporization to develop interlaminar adhesion as great as that of similar compositions without wax can be at least partially overcome by incorporating at least about 0.1 percent by weight, based on the total weight of polyester polymer and curing agent, of a suitable tertiary aromatic amine in the composition, where the proportion of non-reinforcing filler, if any, is not more than about 10%. These materials are monoamines having a single aromatic group and two alkyl or hydroxyalkyl groups on the amino nitrogen atom. Preferred materials include N,N-dimethylaniline, N,N-diethylaniline and N-methyl-N-ethylaniline.

The tertiary aromatic monoamines of the present compositions are known as cure promoters in peroxide-catalyzed unsaturated polyester resin compositions, but the proportions called for in the present invention to be effective in overcoming the loss of interlaminar adhesion resulting from incorporation of sufficient wax to reduce styrene vaporization significantly are considerably greater than have heretofore been used in such wax-containing compositions absent high loadings of non-reinforcing filler. The exact proportions of these amines which will give the most satisfactory combination of product and process characteristics must, of course, be determined for each resin and use, as is also true for the other components of the composition. In particular, when small proportions of mineral spirits are added, smaller proportions of the amine component have been found effective for enhancing interlaminar adhesion. (Some mineral spirits may also be present as the diluent for cobalt promoters.)

The compositions of this invention can be formed into laminated resinous articles using any of the conventional processes known in the art. Ordinarily, successive layers are superimposed over a die or mold, with at least partial cure before the succeeding layer is applied. Where glass mat or fiber is used as reinforcement, the liquid laminating composition can be worked into its interstices by rolling or brushing. While these compositions are ordinarily appropriately catalyzed to cure adequately at ambient temperatures in one or a few days, they can be heated to accelerate final cure if desired.

It is preferred that from about 25 to about 50 percent by weight of glass fiber be used as reinforcement, based on the total weight of polyester and curing agent. Particularly where such glass fiber is in the form of fiber or mat, it has been found that the interlaminar adhesion can be further enhanced by distributing a light "dusting" of chopped glass fibers over each layer while it is still wet and before the succeeding layer is superposed thereover.

The laminating compositions of this invention may also contain such other conventional components as inhibitors, dyes, pigments, inert or reinforcing fillers, etc., so long as the proportion of non-reinforcing filler is not greater than about 10%.

BEST MODE FOR CARRYING OUT THE INVENTION

EXAMPLE 1

The following laminating compositions were formulated using Owens-Corning Fiberglas polyester E-440, which is a conventional unsaturated polyester polymer suitable for laminating and containing 35 mole percent maleic and 65 mole percent orthophthalic acids condensed with propylene glycol. Compositions B and C are illustrative of the invention and A is for comparison.

| Material | Weight Parts | | |
|---|---|---|---|
| | A | B | C |
| E-440 polyester | 8.60 | 86.0 | 86.0 |
| Styrene | 12.5 | 12.5 | 12.5 |
| Paraffin wax | 0.17 | 0.17 | 0.17 |
| Glycerol | 0.15 | 0.15 | 0.15 |
| Powdered silica | 0.9 | 0.9 | 0.9 |
| Hydroquinone inhibitors (10% in propylene glycol) | 0.068 | 0.068 | 0.068 |
| Cobalt octoate (12% in mineral spirits) | 0.07 | 0.07 | 0.07 |
| Cobalt Hydroxy Ten Cem (a cobalt salt promoter of Mooney Chemical Co. as 21% dispersion in mineral spirits) | 0.046 | 0.046 | 0.046 |
| Copper naphthenate (10%) | 0.012 | 0.012 | 0.012 |
| Methylethylketone peroxide (60%) | 1.0 | 1.0 | 1.0 |
| N,N-diethylaniline | 0.068 | 0.15 | 0.24 |

All components were mixed together except the catalyst (MEKP), which was added just before use.

EXAMPLE 2

Test laminates were prepared from each of the compositions of Example 1 and evaluated for interlaminar adhesion as follows. In every case the MEKP catalyst was added just before use.

A "skin" layer containing 15% glass by weight was prepared by working catalyzed laminating composition into one 6×12 inch ply of a 1.5 oz./sq. ft. glass fiber mat and allowing it to cure at room temperature for 24 hours.

A three layer "body" portions containing 25% glass was then laid up over the skin layer by superposing in rapid succession three 6×12 inch plies of the same glass mat and working catalyzed laminating composition into each ply before applying the next. A narrow strip along one edge of the skin layer was covered with a cellophane parting sheet before superposing the body portion of the laminate to provide a starting place for the delamination test. The laminate so formed was permitted to cure at room temperature for an additional 24 hours.

The laminate was then split apart by forcing a wedge such as a screwdriver into the slot formed by the parting sheet between portions of the skin and body layers. The interlaminar adhesion rating was determined by observing the percentages of each of the two fracture surfaces on which broken glass fibers were exposed. The results were: A-5%/10%, B-100%/75% and C-100%/90%, indicative of poor interlaminar adhesion for composition A in contrast to very good adhesion for compositions B and C.

It will be evident that numerous variations and modifications can be made in practicing this invention and these are contemplated as being within the scope of the invention.

We claim:

1. In a laminating composition comprising (i) an ethylenically unsaturated polyester polymer, (ii) an ethylenically unsaturated curing agent comprising styrene, (iii) a free radical catalyst for the cure reaction of said polyester polymer and said curing agent and (iv) paraffin wax, the improvement for enhancing interlaminar adhesion in cured laminates prepared therefrom which comprises said composition (v) further comprising at least about 0.1 percent by weight of a tertiary monoamine having a single aromatic group and two alkyl or hydroxy alkyl groups joined to the amino nitrogen atom thereof and (vi) containing no more than about 10 percent by weight of non-reinforcing filler, where both percentages are based on the total weight of said polymer and said curing agent.

2. A composition according to claim 1 wherein said aromatic group is phenyl.

3. A composition according to claim 2 wherein said amine is N,N-dimethylaniline, N,N-diethylaniline or N-methyl-N-ethylaniline.

* * * * *

UNITED STATES PATENT AND TRADEMARK OFFICE
CERTIFICATE OF CORRECTION

PATENT NO. : 4,296,009
DATED : October 20, 1981
INVENTOR(S) : Edward J. Kerle and Terry R. Beaver It is certified that error appears in the above–identified patent and that said Letters Patent are hereby corrected as shown below:

Column 2, line 44 should read:

the polyester polymer will be a mixture of about 25 to

Column 4, line 32 should read:

E-440 polyester                      86.0      86.0      86.0

Column 4, line 60 should read:

A three layer "body" portion containing 25% glass

Signed and Sealed this

Sixteenth Day of February 1982

[SEAL]

Attest:

GERALD J. MOSSINGHOFF

Attesting Officer      Commissioner of Patents and Trademarks